(12) United States Patent
Shin et al.

(10) Patent No.: US 9,459,499 B2
(45) Date of Patent: Oct. 4, 2016

(54) LIQUID CRYSTAL DISPLAY

(71) Applicant: Samsung Display Co., Ltd., Yongin (KR)

(72) Inventors: Dong-Chul Shin, Seoul (KR); Jae-Hong Park, Seoul (KR); Ki-Chul Shin, Seongnam-si (KR); Hyeok-Jin Lee, Seongnam-si (KR)

(73) Assignee: Samsung Display Co., Ltd., Yongin-si (KR)

(*) Notice: Subject to any disclaimer, the term of this patent is extended or adjusted under 35 U.S.C. 154(b) by 28 days.

(21) Appl. No.: 14/206,321

(22) Filed: Mar. 12, 2014

(65) Prior Publication Data
US 2015/0098047 A1    Apr. 9, 2015

(30) Foreign Application Priority Data

Oct. 8, 2013    (KR) .................. 10-2013-0119885

(51) Int. Cl.
*G02F 1/1343*    (2006.01)
*G02F 1/1337*    (2006.01)

(52) U.S. Cl.
CPC ... *G02F 1/134309* (2013.01); *G02F 1/133707* (2013.01); *G02F 1/13439* (2013.01); *G02F 2001/134318* (2013.01); *G02F 2001/134345* (2013.01)

(58) Field of Classification Search
CPC ............. G02F 1/133514; G02F 2001/136222; G02F 2001/134345
See application file for complete search history.

(56) References Cited

U.S. PATENT DOCUMENTS

| | | | |
|---|---|---|---|
| 2005/0280761 A1 | 12/2005 | Ishii | |
| 2006/0044501 A1 | 3/2006 | Mizusako | |
| 2006/0066799 A1 | 3/2006 | Mizusako et al. | |
| 2010/0118236 A1* | 5/2010 | Kim et al. | ...................... 349/106 |
| 2011/0216261 A1* | 9/2011 | Han | .................. G02F 1/134336 349/42 |
| 2011/0261278 A1 | 10/2011 | Oh et al. | |
| 2013/0002625 A1* | 1/2013 | Liao | .................. G02F 1/134309 345/205 |
| 2015/0268517 A1* | 9/2015 | Song | .................. G02F 1/134309 349/43 |

FOREIGN PATENT DOCUMENTS

| | | | |
|---|---|---|---|
| JP | 2005-316330 | | 11/2005 |
| JP | 2007-279478 | | 10/2007 |
| JP | 2007279478 A | * | 10/2007 |
| JP | 2011-221400 | | 11/2011 |
| KR | 10-2008-0022355 | | 3/2008 |
| KR | 20080022355 A | * | 3/2008 |

* cited by examiner

*Primary Examiner* — Timothy L Rude
(74) *Attorney, Agent, or Firm* — H.C. Park & Associates, PLC

(57) ABSTRACT

A liquid crystal display includes a first substrate and a second substrate facing each other, a pixel electrode on the first substrate, a common electrode on the second substrate, and a liquid crystal layer between the first substrate and the second substrate, wherein the common electrode includes a first cutout portion, and the pixel electrode includes a first sub-pixel electrode, a second sub-pixel electrode surrounding the first sub-pixel electrode, a second cutout portion adjacent to at least one of edges of the second sub-pixel electrode and disposed along the edges, and a third cutout portion isolating the first sub-pixel electrode from the second sub-pixel electrode, and the first sub-pixel electrode and the second sub-pixel electrode are located at different heights.

19 Claims, 6 Drawing Sheets

LIQUID CRYSTAL DISPLAY

CROSS REFERENCE TO RELATED APPLICATION

This application claims priority from and the benefit of Korean Patent Application No. 10-2013-0119885, filed on Oct. 8, 2013, which is hereby incorporated by reference for all purposes as if fully set forth herein.

BACKGROUND

1. Field

Exemplary embodiments of the present invention relate to a liquid crystal display capable of improving an aperture ratio and a texture controlling force.

2. Discussion of the Background

A liquid crystal display, one of the most common types of flat panel display, typically includes two display panels on which field generating electrodes, such as a pixel electrode and a common electrode, are disposed and a liquid crystal layer interposed between the two display panels. The liquid crystal display generates an electric field in the liquid crystal layer by applying an electric current to the field generating electrodes, thereby determining orientations of liquid crystal molecules of the liquid crystal layer and controlling polarization of incident light. In this manner, an image is displayed.

Among the liquid crystal displays, a vertical alignment (VA) mode liquid crystal display has been developed. In a VA mode, liquid crystal molecules are aligned so that a long axis of the molecules is vertical with respect to a display panel in a state where no electric field is applied.

In the VA mode liquid crystal display, it is important to ensure a wide viewing angle. For this purpose, a method of forming a cutout, such as a micro-slit, and/or a protrusion on the field generating electrode is typically used. Cutouts and protrusions in the field generating electrode determine a tilt direction of liquid crystal molecules, such that a viewing angle may increase by appropriately disposing the cutouts and/or protrusions to tilt the liquid crystal molecules in various directions.

However, in providing a plurality of branch electrodes by forming a micro-slit on a pixel electrode, an aperture ratio of the liquid crystal display decreases.

SUMMARY

Exemplary embodiments of the present invention provide a liquid crystal display capable of improving an aperture ratio of a liquid crystal display and having a wide viewing angle and a fast response speed.

Exemplary embodiments of present invention also provide a liquid crystal display capable of improving a texture controlling force.

Additional features of the invention will be set forth in the description that follows, and in part will be apparent from the description, or may be learned by practice of the invention.

An exemplary embodiment of the present invention discloses a liquid crystal display including a first substrate and a second substrate facing each other, a pixel electrode on the first substrate, a common electrode on the second substrate, and a liquid crystal layer between the first substrate and the second substrate. The common electrode has a first cutout portion and the pixel electrode has a first sub-pixel electrode, a second sub-pixel electrode surrounding the first sub-pixel electrode, a second cutout portion adjacent to at least one of edges of the second sub-pixel electrode and disposed along the at least one edge, and a third cutout portion isolating the first sub-pixel electrode from the second sub-pixel electrode. The first sub-pixel electrode and the second sub-pixel electrode are located at different heights.

According to embodiments of the present invention, the liquid crystal display described above may have the following effects.

According to embodiments of the present invention, the liquid crystal display may include a first cross-shaped cutout portion in a common electrode and a second cutout portion adjacent to an edge of a pixel electrode, so that a viewing angle may increase and a response speed and an aperture ratio may be improved.

A second sub-pixel electrode may be formed at a distance from a first sub-pixel electrode so as to surround the rhombus-shaped first sub-pixel electrode, so that a controlling force may increase and visibility may be improved.

In addition, the first sub-pixel electrode and the second sub-pixel electrode may be located at different heights, so that a controlling force may increase.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF THE ILLUSTRATED EMBODIMENTS

Figure 1:
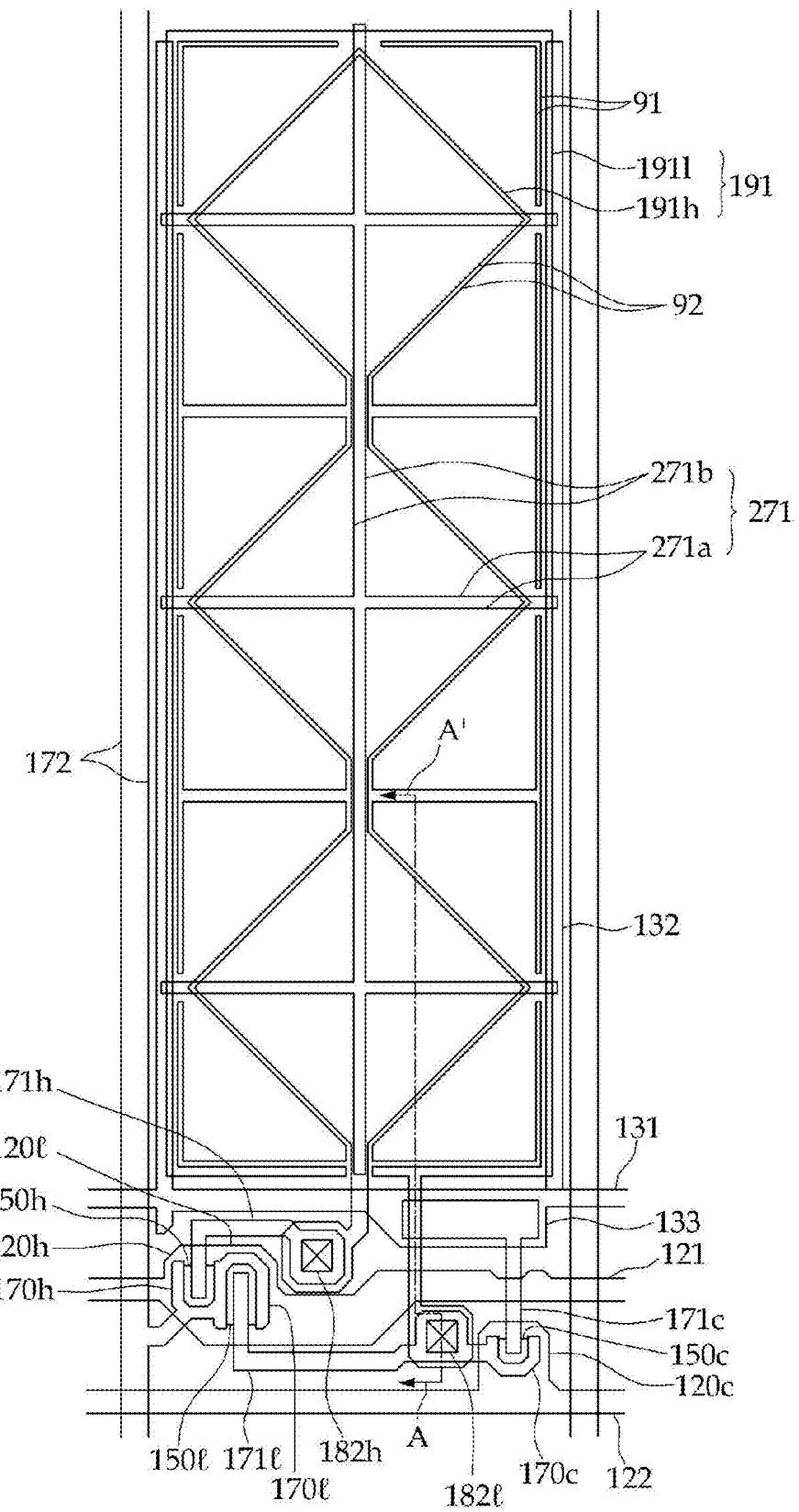
FIG. 1 is a layout view of one pixel of a liquid crystal display according to an embodiment of the present invention.

Advantages and features of the present invention and methods for achieving them will be made clear from embodiments described below in detail with reference to the accompanying drawings. The present invention may, however, be embodied in many different forms and should not be construed as limited to the embodiments set forth herein. Rather, these embodiments are provided so that this disclosure will be thorough and complete, and will fully convey the scope of the invention to those skilled in the art. This invention will be defined only by the scope of the claims. Therefore, well-known constituent elements, operations and techniques are not described in detail in the embodiments, to prevent the present invention from being obscurely interpreted. Like reference numerals refer to like elements throughout the specification.

Spatially relative terms, such as "below," "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used in this specification is merely used to describe embodiments of the present invention and is not intended to limit the invention. An expression used in the singular encompasses the expression of the plural unless it has a clearly different meaning in the context. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Unless otherwise defined, all terms including technical and scientific terms used herein have the same meaning as commonly understood by those skilled in the art to which this invention pertains.

It will be further understood that terms, such as those defined in commonly used dictionaries, should be interpreted as having a meaning that is consistent with their meaning in the context of the relevant art and will not be interpreted in an ideal or excessively formal sense unless clearly defined in the present application.

First, a liquid crystal display according to an embodiment of the present invention will be described with reference to FIGS. 1 to 3.

FIG. 1 is a layout view of one pixel of a liquid crystal display according to an embodiment of the present invention. FIG. 2 is a cross-sectional view of one pixel of a liquid crystal display according to an embodiment of the present invention, taken along line A-A' in FIG. 1. FIG. 3 is an equivalent circuit diagram of one pixel of a liquid crystal display according to an embodiment of the present invention.

The liquid crystal display according to an embodiment of the present invention includes a lower panel 100 and an upper panel 200 facing each other, and a liquid crystal layer 300 disposed between panels 100 and 200.

First, the lower panel 100 will be described.

A gate line 121, a step-down gate line 122, and a storage electrode line 131 are formed on a first substrate 110 in one direction. The first substrate 110 may include a transparent material, such as glass or transparent plastic, but is not limited thereto.

The gate line 121 extends in a substantially horizontal direction and transmits a gate signal. The gate line 121 includes a first gate electrode 120$h$ and a second gate electrode 120$l$, that protrude from the gate line 121. The step-down gate line 122 includes a third gate electrode 120$c$ protruding therefrom. The first and second gate electrodes 120$h$ and 120$l$, are connected to the same gate line 121, and the same gate signal is applied to the first and second gate electrodes 120$h$ and 120$l$.

The storage electrode line 131 extends in substantially the same direction as the gate line 121, and a voltage may be applied to the storage electrode line 131. The storage electrode line 131 includes a storage electrode 132 and a protrusion 133 that protrudes from the storage electrode line 131. The storage electrode 132 may be formed to surround a pixel electrode 191 that will be described below, and the protrusion 133 may protrude toward the gate line 121.

A gate insulating layer 140 may be formed on the gate line 121, the step-down gate line 122, the storage electrode line 131, the first, second, and third gate electrodes 120$h$, 120$l$, and 120$c$, respectively, the storage electrode 132, and the protrusion 133. The gate insulating layer 140 may include an inorganic insulating material, such as silicon nitride and silicon oxide, but is not limited thereto. Further, the gate insulating layer 140 may include a single layer or multiple layers.

First, second, and third semiconductor layers 150$h$, 150$l$, and 150$c$, respectively, are formed on the gate insulating layer 140. The first semiconductor layer 150$h$ may be disposed on the first gate electrode 120$h$, the second semiconductor layer 150$l$ may be disposed on the second gate electrode 120$l$, and the third semiconductor layer 150$c$ may be disposed on the third gate electrode 120$c$.

The first, second, and third semiconductor layers 150$h$, 150$l$, and 150$c$ may include at least one of amorphous silicon, polycrystalline silicon, and metal oxide, but is not limited thereto.

Ohmic contacts (not shown) may be disposed on the first, second, and third semiconductor layers 150$h$, 150$l$, and 150$c$, respectively.

A data line 172, a first source electrode 170$h$, a first drain electrode 171$h$, a second source electrode 170$l$, a second drain electrode 171$l$, a third source electrode 170$c$, and a third drain electrode 171$c$ may be disposed on the first, second, and third semiconductor layers 150$h$, 150$l$, and 150$c$, and the gate insulating layer 140.

The first, second, and third semiconductor layers 150$h$, 150$l$, and 150$c$, respectively, may be disposed on the first, second, and third gate electrodes 120$h$, 120$l$, and 120$c$, respectively, and may also be disposed under the data line 172. Further, the second semiconductor layer 150$l$ and the third semiconductor layer 150$c$ may be connected to each other. However, the present invention is not limited thereto. The first, second, and third semiconductor layers 150$h$, 150$l$, and 150c may be only formed on the first, second, and third gate electrodes 120h, 120l, and 120c, or the second and third semiconductor layers 150l and 150c may be disposed to be separate from each other.

The data line 172 may transmit a data voltage, and mostly extends in a vertical direction to intersect the gate line 121.

The first source electrode 170h may protrude above the first gate electrode 120h from the data line 172. The first source electrode 170h may be bent in a "C" shape on the first gate electrode 120h.

The first drain electrode 171h may be formed to be spaced apart from the first source electrode 170h on the first gate electrode 120h. A channel may be formed in the exposed first semiconductor layer 150h between the first source electrode 170h and the first drain electrode 171h that are spaced apart from each other.

The second source electrode 170l may protrude above the second gate electrode 120l from the data line 172. The second source electrode 170l may be bent in a "C" shape on the second gate electrode 120l.

The second drain electrode 171l may be formed to be spaced apart from the second source electrode 170l on the second gate electrode 120l. A channel may be formed in the exposed second semiconductor layer 150l between the second source electrode 170l and the second drain electrode 171l that are spaced apart from each other.

The third source electrode 170c may be formed on the protrusion 133 and the third gate electrode 120c. One end of the third source electrode 170c may be bent in a "C" shape on the third gate electrode 120c.

The third drain electrode 171c may be connected to the second drain electrode 171l, and may be spaced apart from the third source electrode 170c on the third gate electrode 120c. A channel may be formed in the exposed third semiconductor layer 150c between the third source electrode 170c and the third drain electrode 171c that are spaced apart from each other.

A first switching element may include the first gate electrode 120h, the first semiconductor layer 150h, the first source electrode 170h, and the first drain electrode 171h, which are described above. Further, a second switching element may include the second gate electrode 120l, the second semiconductor layer 150l, the second source electrode 170l, and the second drain electrode 171l, and a third switching element may include the third gate electrode 120c, the third semiconductor layer 150c, the third source electrode 170c, and the third drain electrode 171c.

A first passivation layer 180p may be formed on the semiconductor layers 150h, 150l, and 150c exposed between the data line 172, the first, second, and third source electrodes 170h, 170l, and 170c, the first, second, and third drain electrodes 171h, 171l, and 171c, the respective source electrodes 170h, 170l, and 170c and the respective drain electrodes 171h, 171l, and 171c. The first passivation layer 180p may include an inorganic insulating material such as silicon nitride and silicon oxide, but is not limited thereto.

A color filter 230 may be disposed on the first passivation layer 180p except for where a first thin film transistor Qh, a second thin film transistor Ql, and a third thin film transistor Qc are located. The color filter 230 may also be disposed in a vertical direction in a space between the adjacent data lines 172. Each color filter 230 may display one of three primary colors, i.e., red, green, and blue. However, the color filter 230 is not limited to the three primary colors, and may display one of cyan, magenta, yellow, and white-based colors.

A light blocking member 220 may be disposed in a region where the color filter 230 is not located and on a portion of the color filter 230. The light blocking member 220 is also referred to as a black matrix and may prevent light leakage. The light blocking member 220 extends upward and downward along the gate line 121 and the step-down gate line 122, and may include a horizontal light blocking member covering a region where a first thin film transistor Qh, a second thin film transistor Ql, and a third thin film transistor Qc are located and a vertical light blocking member extending along the data line 172. A portion of light blocking member 220 may have a smaller height than that of the color filter 230.

A second passivation layer 180q may be further included on the color filter 230 and the light blocking member 220. The second passivation layer 180q may include an inorganic insulating material such as silicon nitride and silicon oxide or an organic insulation material, but is not limited thereto. The second passivation layer 180q prevents the color filter 230 and the light blocking member 220 from separating from the layers on which they are formed, and suppresses contamination of the liquid crystal layer 300, caused by an organic material such as a solvent flowing from the color filter 230, so that defects such as an image retention that may be generated during driving may be prevented.

A first contact hole 182h and a second contact hole 182l, exposing a wide ended portion of the first drain electrode 171h and a wide ended portion of the second drain electrode 171l, respectively, may be formed on the first passivation layer 180p, the light blocking member 220, and the second passivation layer 180q.

The pixel electrode 191 may be formed on the second passivation layer 180q. The pixel electrode 191 may include a first sub-pixel electrode 191h and a second sub-pixel electrode 191l. In detail, on the second passivation layer 180q, the first sub-pixel electrode 191h may be connected to the first drain electrode 171h through the first contact hole 182h, and the second sub-pixel electrode 191l may be formed to be connected to the second drain electrode 171l, through the second contact hole 182l.

The third source electrode 170c and the protrusion 133 overlap the gate insulating layer 140 and the third semiconductor layer 150c interposed therebetween to form a step-down capacitor Cstd. In this case, the third semiconductor layer 150c may be omitted from the overlapping portion of the third source electrode 170c and the protrusion 133.

The first sub-pixel electrode 191h and the second sub-pixel electrode 191l, are applied with a data voltage from the first drain electrode 171h and the second drain electrode 171l, respectively. When a gate-on voltage is applied to the step-down gate line 122, a part of the data voltage applied to the second sub-pixel electrode 191l is divided, such that the voltage applied to the second sub-pixel electrode 191l may be lower than the voltage applied to the first sub-pixel electrode 191h.

The second sub-pixel voltage applied to the second sub-pixel electrode 191l is about 0.9 times or less the voltage of the first sub-pixel applied to the first sub-pixel electrode 191h. For example, the second sub-pixel voltage may be about 0.75 times or about 0.85 times the voltage of the first sub-pixel.

The first sub-pixel electrode 191h and the second sub-pixel electrode 191l, which receive the data voltage, generate an electric field together with a common electrode 270, which is disposed on an upper panel 200, so as to determine a direction of the liquid crystal molecules 310 of the liquid crystal layer 300 between the two electrodes 191 and 270.

Luminance of light passing through the liquid crystal layer 300 varies depending on the direction of the liquid crystal molecules 310 determined as above.

The first sub-pixel electrode 191h and the common electrode 270 form a first liquid crystal capacitor Clch together with the liquid crystal layer 300 disposed therebetween. The second sub-pixel electrode 191l and the common electrode 270 form a second liquid crystal capacitor Clcl together with the liquid crystal layer 300 disposed therebetween. Thus, capacitors Clch and Clcl allow the applied voltages to be maintained even after the first and second thin film transistors Qh and Ql are turned off.

The first and second sub-pixel electrodes 191h and 191l, overlap a storage electrode 132 and a storage electrode line 131 to form first and second storage capacitors, and the first and second storage capacitors may maintain the voltage storage capacitance of each of the first and second liquid crystal capacitors Clch and Clcl.

A shape of the first sub-pixel electrode 191h is a quadrilateral and two angles facing each other in the quadrilateral may be obtuse angles or acute angles. For example, the shape of the first sub-pixel electrode 191h may be a rhombus, and the first sub-pixel electrode 191h may be surrounded by the second sub-pixel electrode 191l. The pixel electrode 191 may have a second cutout portion 91 that is adjacent to at least one of edges of the second sub-pixel electrode 191l, and disposed along the at least one of the edges. The pixel electrode 191 may further have a third cutout portion 92 that separates the first sub-pixel electrode 191h from the second sub-pixel electrode 191l. The shapes of the first and second sub-pixel electrodes 191h and 191l will be described below in more detail with reference to FIG. 5.

Hereinafter, a height difference between the first sub-pixel electrode 191h and the second sub-pixel electrode 191l will be described.

The pixel electrode 191 may have a structure in which a texture controlling force is reduced as a voltage difference between the first sub-pixel electrode 191h and the second sub-pixel electrode 191l, decreases. The texture controlling force is reduced as a separation distance between the first sub-pixel electrode 191h and the second sub-pixel electrode 191l, increases. When the distance between the first sub-pixel electrode 191h and the second sub-pixel electrode 191l increases, a fringe field increases due to a potential difference between the second sub-pixel electrode 191l and the common electrode 270, and the texture controlling force is reduced because the liquid crystal molecules are disturbed in the area of the third cutout 92.

In order to reinforce the texture controlling force according to a separation distance and a voltage ratio between the first sub-pixel electrode 191h and the second sub-pixel electrode 191l, the first sub-pixel electrode 191h and the second sub-pixel electrode 191l may be disposed at different heights.

The height difference between the first sub-pixel electrode 191h and the second sub-pixel electrode 191l, may be about 500 Å to 1500 Å.

The height difference between the first sub-pixel electrode 191h and the second sub-pixel electrode 191l, is shown in the following embodiment of the present invention.

The second passivation layer 180q may have an opening 181 having a shape corresponding to the first sub-pixel electrode 191h. The second passivation layer 180q may have a thickness of about 500 Å to about 1500 Å. Accordingly, a height difference between a portion where the opening 181 is formed and a portion where opening 181 is not formed may occur, and the height difference may be from about 500 Å to about 1500 Å.

Therefore, the first sub-pixel electrode 191h and the second sub-pixel electrode 191l may be disposed at different heights by the opening 181. For example, the first sub-pixel electrode 191h may be located in the opening 181 of the second passivation layer 180q. As described above, when the first sub-pixel electrode 191h is located in the opening 181, the first sub-pixel electrode 191h may be disposed at a different height from the second sub-pixel electrode 191l, and the height difference may be about 500 Å to about 1500 Å due to the thickness of the second passivation layer 180q.

The opening 181 may be replaced by a protrusion. In this case, the protrusion area of the second passivation layer 180q may be thicker than the area of the second passivation layer 180q that does not have the protrusion. Therefore, when the first sub-pixel electrode 191h is disposed on the protrusion, the first sub-pixel electrode 191h and the second sub-pixel electrode 191l may also be disposed at different heights.

In addition to the arrangement of the first sub-pixel electrode 191h and the second sub-pixel electrode 191l due to the opening 181 disclosed above, a variety of different arrangements may be formed, as would be appreciated by one having skill in the art. For example, a dented portion or a protruding portion may be formed under the second sub-pixel electrode 191l.

A texture controlling force of display devices may be improved by the height difference between the first sub-pixel electrode 191h and the second sub-pixel electrode 191l. The improvement in the texture controlling force due to the height difference will be described below in more detail with reference to FIG. 7.

A first alignment layer 11 may be formed on the pixel electrode 191 and the second passivation layer 180q. The first alignment layer 11 may be a vertical alignment layer or a photo-alignment layer including a photopolymer material.

The upper panel 200 will be described below.

The common electrode 270 may be formed on a second substrate 210. The common electrode 270 may include a transparent metal material, e.g., Indium Tin Oxide (ITO) or Indium Zinc Oxide (IZO). The common electrode 270 may be applied with a voltage, and an electric field may be generated between the pixel electrode 191 and the common electrode 270.

The common electrode 270 may include a first cross-shaped cutout portion 271. The shape of the first cutout portion 271 will be described below in more detail with reference to FIG. 5.

A second alignment layer 21 may be formed on the common electrode 270. The second alignment layer 21 may be a vertical alignment layer or a photo-alignment layer including a photopolymer material.

Polarizers (not shown) may be formed on the outer surfaces of the lower panel 100 and the upper panel 200. Polarization axes of the two polarizers may be orthogonal to each other, and one polarization axis thereof may be parallel to the gate line 121. In the case of a reflective display device, one of the two polarizers may be omitted.

Figure 3:
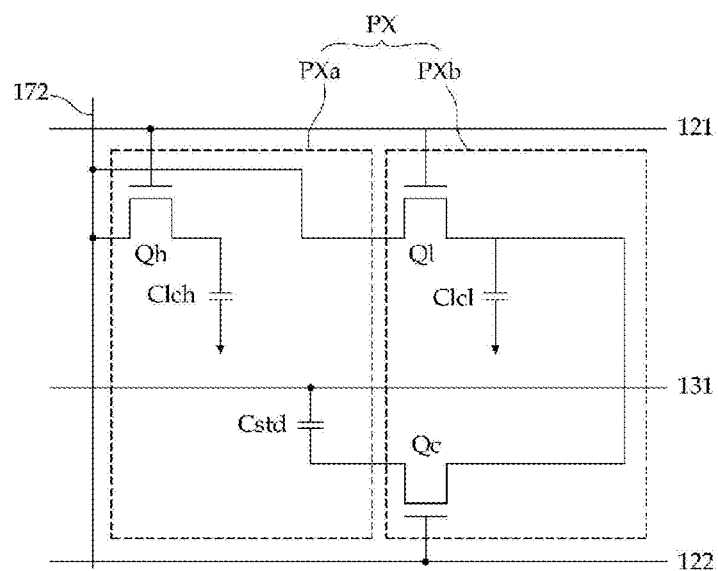
FIG. 3 is an equivalent circuit diagram of one pixel of a liquid crystal display according to an embodiment of the present invention.

FIG. 3 is an equivalent circuit diagram of a pixel of a liquid crystal display according to an embodiment of the present invention.

According to an embodiment of the present invention, a liquid crystal display includes a plurality of signal lines 121, 122, 131, and 172, and a plurality of pixels connected thereto.

The signal lines 121, 122, 131, and 172 may include a gate line 121 and a step-down gate line 122, which transmit a gate signal, a data line 172 transmitting a data voltage, and a storage electrode line 131 applied with a voltage.

A first switching element Qh and a second switching element Ql are connected to the same gate line 121 and the same data line 172. A third switching element Qc is connected to the step-down gate line 122.

The first and second switching elements Qh and Ql are connected to the gate line 121 and the data line 172, respectively, and the third switching element Qc is connected to the step-down gate line 122.

Each pixel PX includes two subpixels PXa and PXb. The first subpixel PXa includes a first liquid crystal capacitor Clch connected to the first switching element Qh, and the second subpixel PXb includes a second liquid crystal capacitor Clcl connected to the second switching element Ql.

A first terminal of the first and second switching elements Qh and Ql is connected to the gate line 121, a second terminal is connected to the data line 172, and a third terminal is connected to the first and second liquid crystal capacitors Clch and Clcl, respectively.

A first terminal of the third switching element Qc is connected to the step-down gate line 122, a second terminal is connected to the second liquid crystal capacitor Clcl, and a third terminal is connected to the step-down capacitor Cstd.

The step-down capacitor Cstd is connected to the storage electrode line 131 as well as the third terminal of the third switching element Qc. An output terminal of the storage electrode line 131 and the third switching element Qc overlap an insulator interposed therebetween.

When a gate-on voltage is applied to the gate line 121, the first switching element Qh and the second switching element Ql, which are connected to the gate line 121, are turned on. In this case, the first and second liquid crystal capacitors Clch and Clcl may be charged by the same voltage as the data voltage transmitted through the data line 172.

Thereafter, when a gate-off signal is applied to the gate line 121 and a gate-on voltage is applied to the step-down gate line 122, the first switching element Qh and the second switching element Ql are turned off, and the third switching element Qc is turned on. Then, a charge may transfer from the second liquid crystal capacitor Clcl to the step-down capacitor Cstd by the third switching element Qc. By this configuration, the charged voltage of the second liquid crystal capacitor Clcl may be lowered and the step-down capacitor Cstd may be charged. The charged voltage of the second liquid crystal capacitor Clcl may be lowered as much as a capacitance of the step-down capacitor Cstd, and thus the charged voltage of the second liquid crystal capacitor Clcl may be lower than the charged voltage of the first liquid crystal capacitor Clch. Therefore, horizontal or vertical viewing angle may be improved by changing voltages that are charged to the first and second subpixels PXa and PXb of the same pixel PX.

A liquid crystal display according to another embodiment of the present invention will now be described with reference to FIG. 4.

Figure 2:
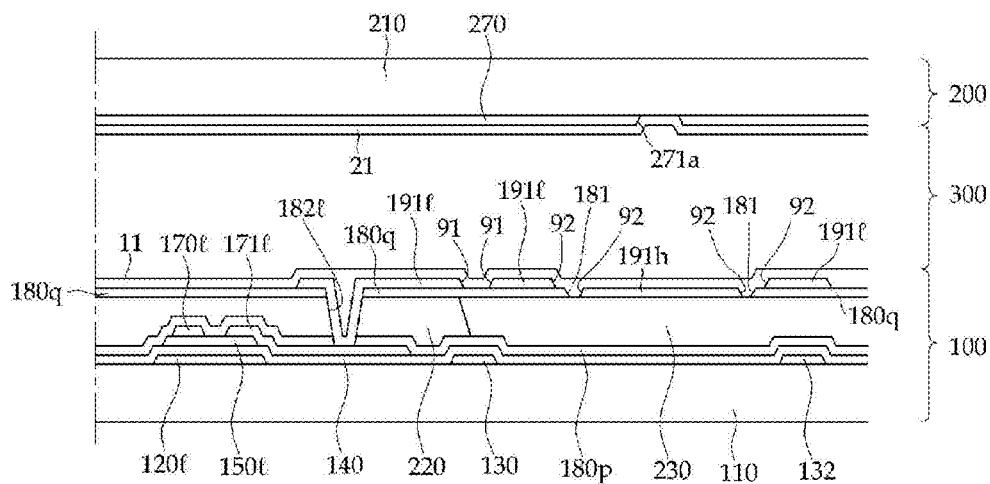
FIG. 2 is a cross-sectional view of one pixel of a liquid crystal display according to an embodiment of the present invention, taken along line A-A' in FIG. 1.
Figure 4:
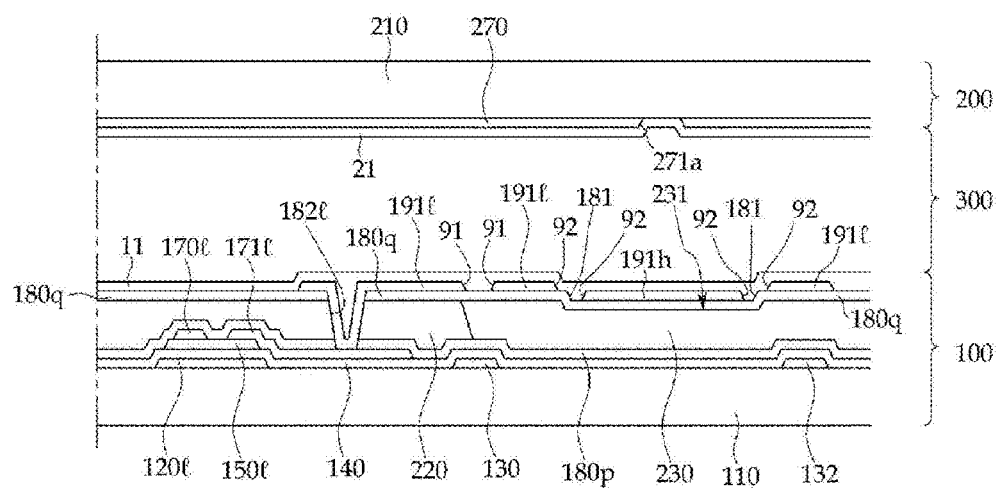
FIG. 4 is a cross-sectional view of one pixel of a liquid crystal display according to another embodiment of the present invention, taken along line A-A' in FIG. 1.

The liquid crystal display according to another embodiment of the present invention, which is shown in FIG. 4, is substantially identical with the liquid crystal display according to an embodiment of the present invention, which is shown in FIGS. 1 to 3, and thus the duplicate description will be omitted. The present embodiment is different from the foregoing embodiment in that a groove 231 is formed on the color filter 230 to correspond to the opening 181 of the second passivation layer 180q, and it will be described below in more detail.

FIG. 4 is a cross-sectional view of one pixel of a liquid crystal display according to another embodiment of the present invention, taken along line A-A' in FIG. 1.

In the case of the lower panel 100 of the liquid crystal display according to another embodiment of the present invention, the first passivation layer 180p, the color filter 230, the light blocking member 220, and the second passivation layer 180q are sequentially laminated on the first substrate 110 as in the foregoing embodiment.

The opening 181, which has a shape corresponding to the first sub-pixel electrode 191h, is formed on the second passivation layer 180q, and the groove 231 is formed on the color filter 230 located under the opening 181. The groove 231 may have a shape corresponding to the first sub-pixel electrode 191h. An outer line of the groove 231 is consistent with that of the opening 181.

The sum of a thickness of the second passivation layer 180q and a depth of the groove 231 may be between 500 Å and 1500 Å.

Therefore, the first sub-pixel electrode 191h and the second sub-pixel electrode 191l may be disposed at different heights due to the groove 231. For example, the first sub-pixel electrode 191h may be disposed in the opening 181 on the groove 231. As described above, since the first sub-pixel electrode 191h is disposed in the opening 181, the height difference between the first sub-pixel electrode 191h and the second sub-pixel electrode 191l may occur. The height difference may vary between 500 Å and 1500 Å, depending on the thickness of the second passivation layer 180q and the depth of the groove 231.

The area of the groove 231 may be dented and replaced by a protrusion. In this case, the color filter 230 may be thicker than other areas on the protrusion. Therefore, when the first sub-pixel electrode 191h is on the protrusion, the first sub-pixel electrode 191h and the second sub-pixel electrode 191l may also be disposed at different heights.

In addition to the arrangement of the first sub-pixel electrode 191h and the second sub-pixel electrode 191l due to the groove 231 disclosed above, a variety of arrangements may be formed, as would be apparent to one having skill in the art.

A texture controlling force of display devices may be improved by the height difference between the first sub-pixel electrode 191h and the second sub-pixel electrode 191l. The improvement in the texture controlling force due to the height difference will be described below in more detail with reference to FIG. 7.

In the foregoing embodiment, the groove 231 is formed at the color filter 230, but the present invention is not limited thereto. The groove 231 may be formed at other organic material layers, e.g., organic insulating layer, overcoat (planarization layer), or the like.

Hereinafter, referring to FIG. 5, a pixel electrode and a common electrode of a liquid crystal display according to an embodiment of the present invention will be described.

Figure 5:
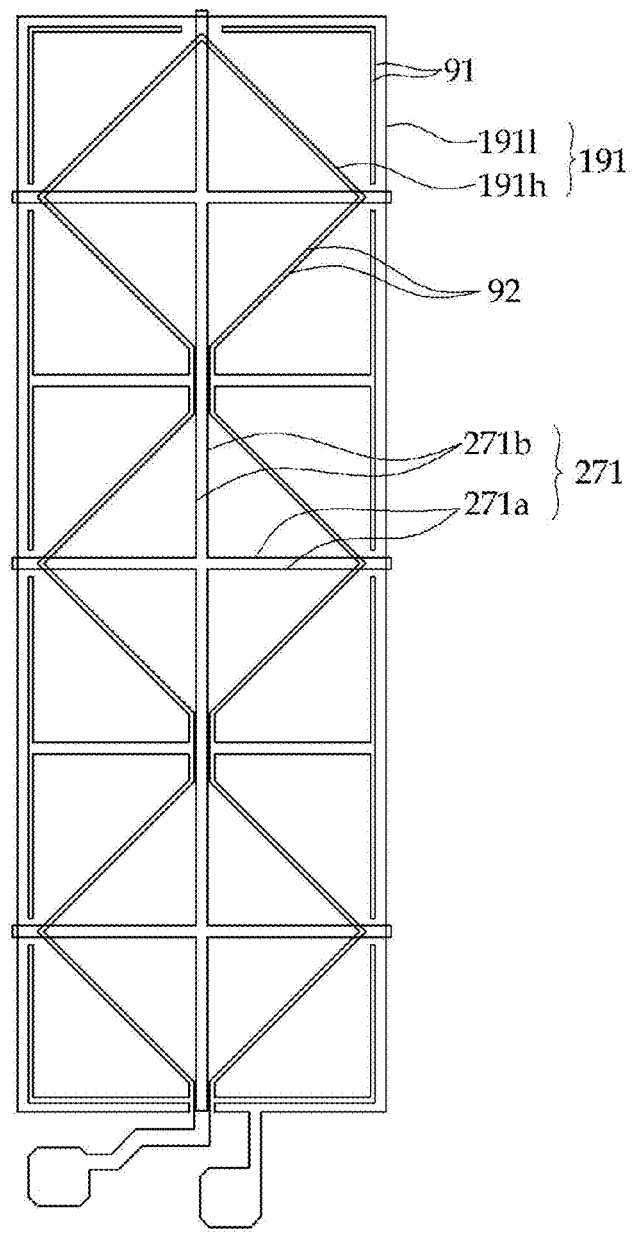
FIG. 5 is a plan view illustrating a first cutout portion of a pixel electrode and a common electrode of one pixel of a liquid crystal display according to an embodiment of the present invention.

FIG. 5 is a plan view illustrating a first cutout portion of a pixel electrode and a common electrode of one pixel of a liquid crystal display according to an embodiment of the present invention.

As illustrated in FIG. 5, the pixel electrode 191 includes the first sub-pixel electrode 191h and the second sub-pixel electrode 191l, the second sub-pixel electrode 191l, includes the second cutout portion 91 at an edge thereof, and the third cutout portion 92 is formed between the first sub-pixel electrode 191h and the second sub-pixel electrode 191l.

A shape of the first sub-pixel electrode 191h may be a quadrilateral, and two angles facing each other in the quadrilateral may be obtuse angles or acute angles. For example, the shape of the first sub-pixel electrode 191h may be a rhombus. In this case, the first sub-pixel electrode 191h may have the shape of three rhombuses connected to one another.

A shape of the second sub-pixel electrode 191l may be a quadrilateral, and a central portion thereof may include a rhombus-shaped hole. Here, the second sub-pixel electrode 191l may have the shape of three quadrilaterals that are connected to one another, and a central portion of each quadrilateral may include a rhombus-shaped hole. The first sub-pixel electrode 191h may be located in the central portion.

The second cutout portion 91 may be disposed around four edges of the second sub-pixel electrode 191l having a quadrilateral shape. The second cutout portion 91 may be formed at one of the four edges, or may be formed at all of the four edges. Here, as illustrated in FIG. 5, the second cutout portions 91 may be spaced apart in the middle of each edge area of the second cutout portion 91 each other. Further, the second cutout portion 91 may be separated at an end of each edge in a different manner than FIG. 5. As illustrated, the second cutout portion 91 may be L-shaped or T-shaped, or otherwise may also be I-shaped.

A distance between the edge of the second sub-pixel electrode 191l and the second cutout portion 91 is less than three times of a distance between the first substrate 110 and the second substrate 210, namely, a cell gap.

Further, a width of the second cutout portion 91 is less than three times of a distance between the first substrate 110 and the second substrate 210, namely, a cell gap.

The third cutout portion 92 may have a rhombus shape, may be disposed between the first sub-pixel electrode 191h and the second sub-pixel electrode 191l, and may separate the first sub-pixel electrode 191h and the second sub-pixel electrode 191l from each other. When the first sub-pixel electrode 191h is in the shape of three rhombus, the third cutout portion 92 may also have the shape of three rhombus that are connected to one another. The third cutout portion 92 may be connected to the second cutout portion 91.

A width of the third cutout portion 92 may be determined by a distance between the first sub-pixel electrode 191h and the second sub-pixel electrode 191l. The width of the third cutout portion 92 may be based on a distance between the first substrate 110 and the second substrate 210; that is, a cell gap. For example, when the cell gap between the first substrate 110 and the second substrate 210 is about 2.8 μm to about 3.2 μm, the width of the third cutout portion 92 may be about 1 μm to about 8 μm.

In other words, the distance between the first sub-pixel electrode 191h and the second sub-pixel electrode 191l may be about 1 μm to about 8 μm.

As illustrated in FIG. 5, the common electrode 270 may include a first cross-shaped cutout portion 271. The first cutout portion 271 may have a shape of three crosses that are connected to one another. The common electrode 270 is disposed in a region that excludes the first cutout portion 271, and thus the reference numeral of the common electrode 270 is not shown in the plan view of FIG. 5.

The first cutout portion 271 may include a first part 271a extending in a horizontal direction and a second part 271b extending in a vertical direction. When the first cutout portion 271 is three cross-shaped, the three first parts 271a and the three second parts 271b may be formed to cross each other, and the second parts 271b may be connected to one another.

The pixel electrode 191 and the common electrode may 270 overlap each other, and thus an electric field may be generated therebetween. Further, the pixel electrode 191 and the common electrode 270 may be divided into a plurality of domains by the cutout portions 91, 92, and 271.

As illustrated in FIG. 5, the pixel electrode 191 has a shape of three repeating quadrilaterals, and the common electrode 270 has a shape of three repeating crosses. A basic region defined by one quadrilateral shape of the pixel electrode 191 and one cross shape of the common electrode 270 will be described as follows.

The first cutout portion 271 is disposed in a basic region to correspond to a center portion of the pixel electrode 191. In detail, the first cutout portion 271 of the common electrode 270 is formed to overlap two diagonal lines crossing in the rhombus shape of the first sub-pixel electrode 191h. In other words, the first part 271a of the first cutout portion 271 may overlap one diagonal line in a horizontal direction, and the second part 271b of the first cutout portion 271 may overlap the other diagonal line in a vertical direction.

The pixel electrode 191 may be divided into a plurality of first domains by the third cutout portion 92 and the first cutout portion 271, and may be divided into a plurality of second domains by the third cutout portion 92 and the second cutout portion 91. Liquid crystal molecules of the liquid crystal layer 300 may be disposed to have a pretilt in different directions for each second domain. That is, the liquid crystal molecules may be disposed to be partitioned into eight domains per basic region.

The process of being partitioned into eight domains will be described in more detail as follows.

The liquid crystal molecules of the liquid crystal layer 300 incline in four directions by a fringe field generated by the first cutout portion 271 of the common electrode 270 and the second cutout portion 91 of the pixel electrode 191. Accordingly, one basic region is partitioned into four domains.

A texture controlling force from a center part of the first cutout portion 271 of the common electrode 270 to the four vertices of the second sub-pixel electrode 191l may be reduced when compared to the other parts. In the liquid crystal display according to an embodiment of the present invention, the third cutout portion 92 is formed between the first sub-pixel electrode 191h and the second sub-pixel electrode 191l, so that the four domains are divided into eight domains, and a fringe field is further generated. As a result, the part which the texture controlling force is comparatively weak may be complemented. In other words, the eight domains are formed, and thus additional fringe fields are formed, thereby improving a texture controlling force.

There are three basic regions per pixel in the foregoing embodiment, but the present invention is not limited thereto. One basic region may be formed per pixel, or four or more basic regions may be formed per pixel, based on a shape or size of a pixel. Further, horizontal and vertical lengths of the pixel electrode 191 and horizontal and vertical lengths of the first cutout portion 271 of the common electrode 270 may be appropriately changed depending on the number of the basic region included in a pixel.

Hereinafter, a method for an initial alignment of liquid crystal molecules 310 to have a pretilt will be described with reference to FIG. 6.

Figure 6:
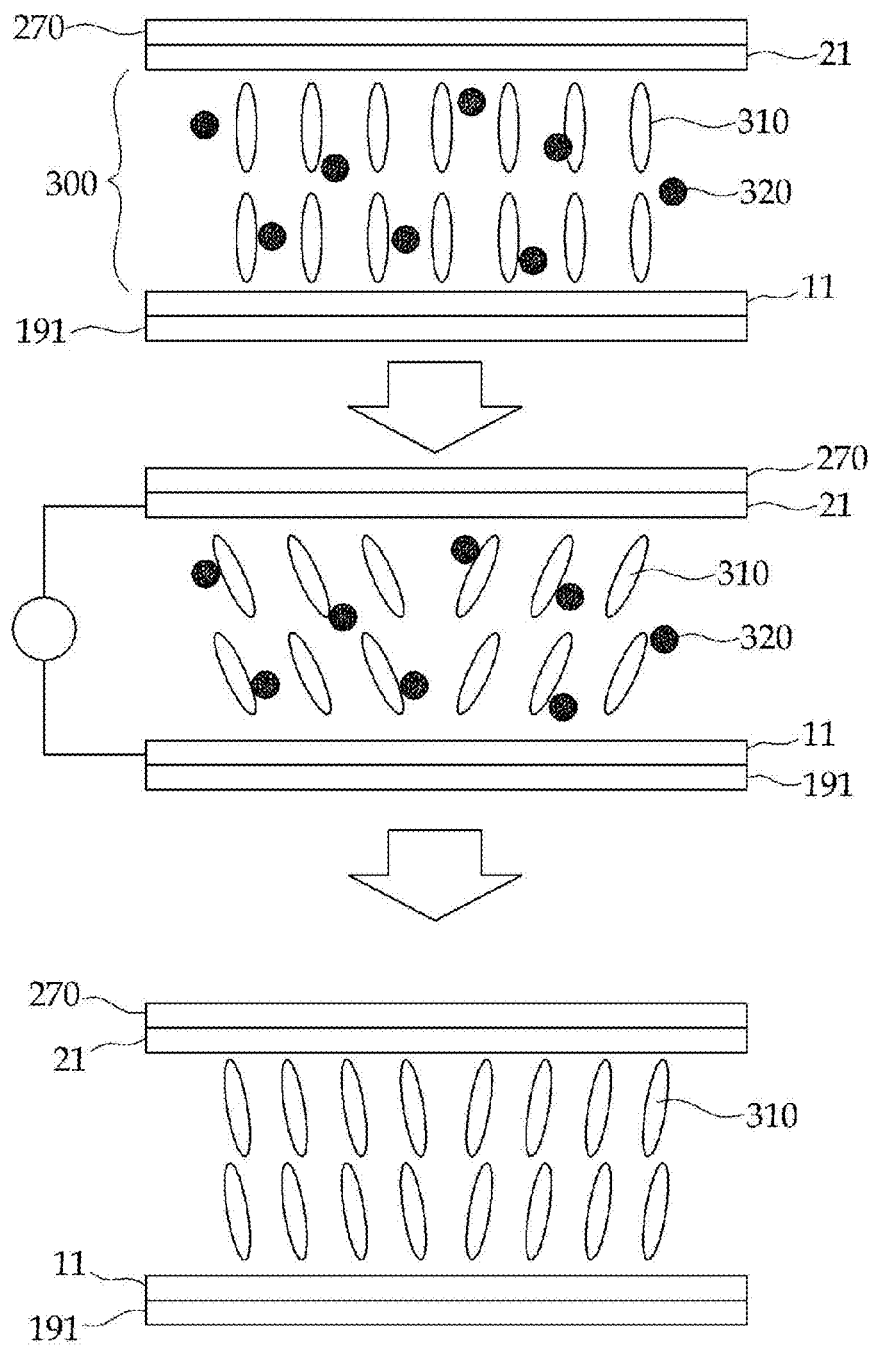
FIG. 6 is a view illustrating a process for allowing liquid crystal molecules to have a pretilt by using a prepolymer polymerized by light such as ultraviolet rays.

FIG. 6 is a view illustrating a process for allowing liquid crystal molecules to have a pretilt by using a prepolymer polymerized by light such as ultraviolet rays.

First, a prepolymer 320 such as a monomer that is hardened through polymerization by light such as ultraviolet rays is injected between the two display panels 100 and 200, together with a liquid crystal material. The prepolymer 320 may be a reactive mesogen that is polymerized by light such as ultraviolet rays.

Next, a voltage is applied to the pixel electrode 191 and a common voltage is applied to the common electrode 270, such that an electric field is generated in the liquid crystal layer 300 between a pair of field generating electrodes. Then, responding to the electric field, the liquid crystal molecules 310 of the liquid crystal layer 300 incline roughly parallel, in a direction toward the center part of the first cross-shaped cutout portion 271 of the common electrode 270 from the four vertices of the pixel electrode 191 by the fringe field formed by the first cutout portion 271 of the common electrode 270 and the second cutout portion 91 of the pixel electrode 191. That is, in a basic region, the liquid crystal molecules 310 incline in four directions. In other words, the liquid crystal molecules 310 disposed in four subregions constituting one basic region may be arranged to have different pretilts.

In the foregoing embodiment, the prepolymer 320 is disposed between the liquid crystal molecules 310, but the present invention is not limited thereto. The prepolymer 320 may be included in the first and second alignment layers 11 and 21. In other words, the prepolymer 320 may be disposed on both the first substrate 110 and the second substrate 210, together with an alignment material when the first and second alignment layers 11 and 21 are formed. The prepolymer 320 may be a reactive mesogen that is polymerized by light such as ultraviolet rays. In this case, the first and second alignment layers 11 and 21 disposed in four subregions constituting one basic region may have different pretilts.

Hereinafter, an improvement degree of a texture controlling force in a liquid crystal display according to an embodiment of the present invention will be described with reference to FIGS. 7 and 8.

Figure 7:
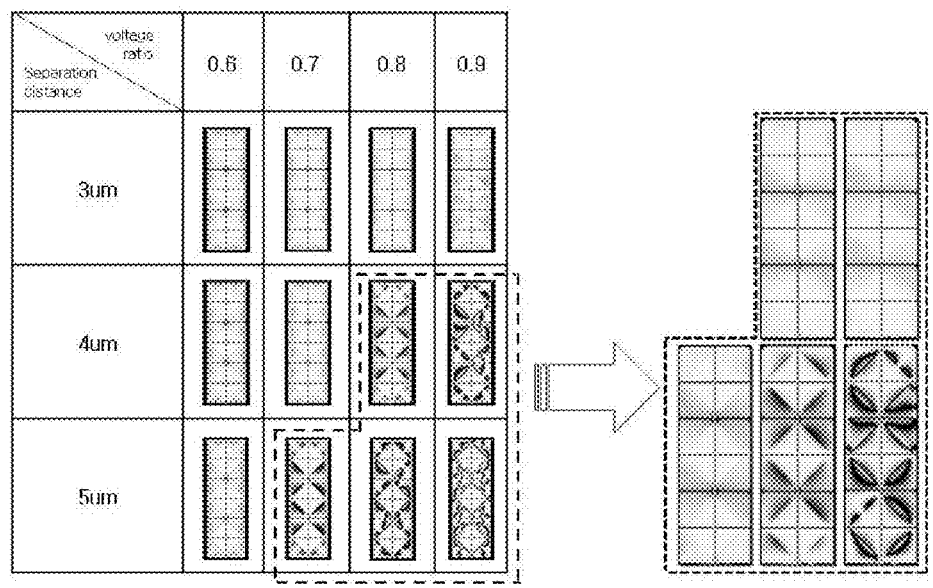
FIG. 7 is a diagram of a texture controlling force according to a voltage ratio and a separation distance between a first sub-pixel electrode and a second sub-pixel electrode.

FIG. 7 is a diagram of a texture controlling force according to a voltage ratio and a distance between of a first sub-pixel electrode and a second sub-pixel electrode. FIG. 8 is a graph showing the visibility of smear artifact as a type of image sticking according to height difference between a first sub-pixel electrode and a second sub-pixel electrode in a liquid crystal display according to an embodiment of the present invention.

The pixel electrode 191 of the present invention has a structure in which a texture controlling force is reduced as a voltage difference between the first sub-pixel electrode 191h and the second sub-pixel electrode 191l is smaller, and the texture controlling force is reduced as a distance between the first sub-pixel electrode 191h and the second sub-pixel electrode 191l is larger. When the distance between the first sub-pixel electrode 191h and the second sub-pixel electrode 191l is larger, a fringe field increases due to a potential difference between the second sub-pixel electrode 191l and the common electrode 270, so that the texture controlling force is reduced.

Therefore, in order to maintain the texture controlling force according to the distance and the voltage ratio between the first sub-pixel electrode 191h and the second sub-pixel electrode 191l, the first sub-pixel electrode 191h and the second sub-pixel electrode 191l are located at different heights in the present invention.

First, referring to FIG. 7, the left table shows liquid crystal textures in a conventional pixel which the height difference between the subpixels does not exist. The horizontal axis of the table indicates voltage ratios between the first sub-pixel electrode 191h and the second sub-pixel electrode 191l. The vertical axis of the table indicates distances between the first sub-pixel electrode 191h and the second sub-pixel electrode 191l. The part shown in dotted lines in the table shows that the texture controlling force decreases as the voltage ratio between the first sub-pixel electrode 191h and the second sub-pixel electrode 191l is higher or the distance therebetween is larger.

The right diagram in FIG. 7 shows that the texture controlling force of the part shown in dotted lines is improved. Due to the height difference, as the texture controlling force is higher, the visibility of the smear artifact is lowered. The height difference between the first sub-pixel electrode 191h and the second sub-pixel electrode 191l may occur due to the opening 181 of the second passivation layer 180q or the color filter 230.

Figure 8:
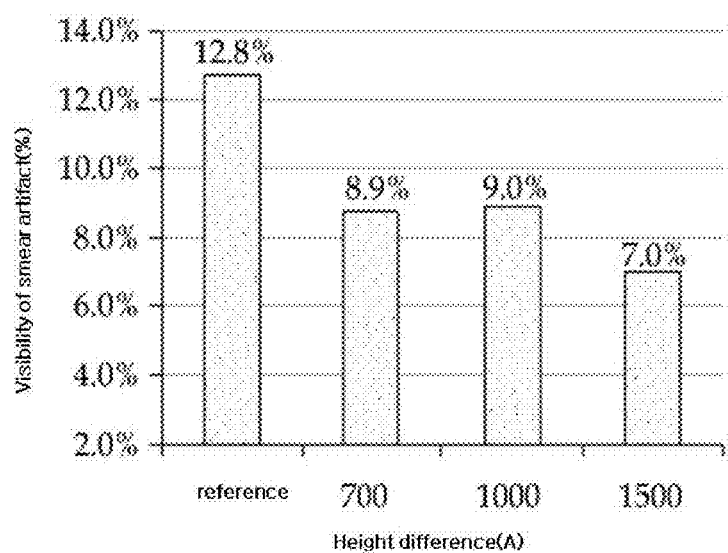
FIG. 8 is a graph showing the visibility of smear artifact as a type of image retention according to height difference between a first sub-pixel electrode and a second sub-pixel electrode in a liquid crystal display according to an embodiment of the present invention.

The graph of FIG. 8 shows three cases in which a thickness of the second passivation layer 180q is 700 Å, 1000 Å, and 1500 Å from the leftmost side of the horizontal axis of the graph where there is no height difference between the first sub-pixel electrode 191h and the second sub-pixel electrode 191l. The thicknesses of 700 Å, 1000 Å, and 1500 Å may be the sum of a thickness of the second passivation layer 180q and a depth of the groove 231 of the color filter 230. The vertical axis of the graph indicates the visibility of the smear artifact, and as the texture controlling force is higher, the smear artifact is lowered. The height difference should be at least 500 Å to improve the texture controlling force according to the height difference. Further, when the height difference is above 1500 Å, a smear may occur due to cell gap variations. Accordingly, the height difference may be about 500 Å to 1500 Å.

Referring to FIGS. 7 and 8, where the first sub-pixel electrode 191h and the second sub-pixel electrode 191l are disposed at different heights, the smear artifact may be reduced compared to where there is no height difference therebetween.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims, and equivalents thereof.

What is claimed is:

1. A liquid crystal display, comprising:
   a first substrate and a second substrate facing each other;
   a pixel electrode on the first substrate;
   a common electrode on the second substrate; and
   a liquid crystal layer between the first substrate and the second substrate,
   wherein:
   the common electrode comprises a first cutout portion, and the pixel electrode comprises a first sub-pixel electrode, a second sub-pixel electrode, a second cutout portion adjacent to at least one of edges of the second sub-pixel electrode and disposed along the at least one edge, and a third cutout portion isolating the first sub-pixel electrode from the second sub-pixel electrode;
   the first sub-pixel electrode has at least one rhombus-shaped portion and is disposed in an opening in a central portion of the second sub-pixel electrode;
   the first sub-pixel electrode and the second sub-pixel electrode are disposed at different heights;

the first sub-pixel electrode is connected to a first switching element and the second sub-pixel electrode is connected to a second switching element;

the first switching element and the second switching element are electrically connected to a gate line respectively;

the second sub-pixel electrode is connected to a third switching element configured to transfer a charge from a liquid crystal capacitor to a step-down capacitor, and the second sub-pixel electrode substantially surrounds the first sub-pixel electrode.

2. The liquid crystal display of claim 1, wherein the height difference between the first sub-pixel electrode and the second sub-pixel electrode is in a range of 500Å to 1500Å.

3. The liquid crystal display of claim 1, further comprising:
a protective layer disposed under the pixel electrode, wherein the protective layer comprises an opening having a shape corresponding to the first sub-pixel electrode.

4. The liquid crystal display of claim 3, wherein the first sub-pixel electrode is disposed in the opening.

5. The liquid crystal display of claim 4, wherein the protective layer has a thickness in a range of 500 Å to 1500 Å.

6. The liquid crystal display of claim 3, further comprising:
an organic material layer disposed under the protective layer,
wherein the organic material layer comprises a groove having a shape corresponding to the first sub-pixel electrode.

7. The liquid crystal display of claim 6, wherein the first sub-pixel electrode is disposed in the groove.

8. The liquid crystal display of claim 6, wherein the organic material layer comprises at least one of a color filter, an organic insulating layer, and a planarization layer.

9. The liquid crystal display of claim 1, wherein the first cutout portion is substantially cross shaped.

10. The liquid crystal display of claim 1, wherein the first cutout portion is disposed to correspond to a central portion of the pixel electrode.

11. The liquid crystal display of claim 10, wherein the pixel electrode is divided into a plurality of first domains by the third cutout portion and the first cutout portion, and liquid crystal molecules of the liquid crystal layer have a pretilt in different directions for each first domain.

12. The liquid crystal display of claim 11, wherein the pixel electrode is divided into a plurality of second domains by the third cutout portion and the second cutout portion, and liquid crystal molecules of the liquid crystal layer have a pretilt in different directions for each second domain.

13. The liquid crystal display of claim 1, further comprising:
a first alignment layer on the first substrate and the pixel electrode, and a second alignment layer on the second substrate and the common electrode,
wherein the first alignment layer and the second alignment layer are vertical alignment layers, the liquid crystal layer comprises liquid crystal molecules and a reactive mesogen, and the liquid crystal molecules have a pretilt.

14. The liquid crystal display of claim 1, further comprising:
a first alignment layer disposed on the first substrate and the pixel electrode, and a second alignment layer disposed on the second substrate and the common electrode,
wherein the first alignment layer and the second alignment layer comprise alignment materials and a reactive mesogen, and have a pretilt.

15. The liquid crystal display of claim 1, wherein the first cutout portion comprises a first part extending in a horizontal direction and a second part extending in a vertical direction.

16. The liquid crystal display of claim 1, further comprising a step-down gate line connected to the third switching element, wherein the charge is transferred from the liquid crystal capacitor to the step-down capacitor in response to the third switching element being turned on by a voltage applied to the step-down gate line.

17. A liquid crystal display, comprising:
a first substrate and a second substrate facing each other;
a thin film transistor disposed on the first substrate;
a color filter disposed on the first substrate;
a first sub-pixel electrode disposed directly on the color filter;
a passivation layer disposed on the color filter;
a second sub-pixel electrode disposed directly on the passivation layer,
a common electrode on the second substrate; and
a liquid crystal layer between the first substrate and the second substrate;
wherein:
the first sub-pixel electrode has at least one rhombus-shaped portion and is disposed in an opening in a central portion of the second sub-pixel electrode;
the first sub-pixel electrode is connected to a first switching element and the second sub-pixel electrode is connected to a second switching element;
the first switching element and the second switching element are electrically connected to a gate line, respectively;
the second sub-pixel electrode is connected to a third switching element configured to transfer a charge from a liquid crystal capacitor to a step-down capacitor, and the second sub-pixel electrode substantially surrounds the first sub-pixel electrode.

18. The liquid crystal display of claim 17, wherein the common electrode comprises a first cutout portion, and a pixel electrode comprises the first sub-pixel electrode, the second sub-pixel electrode, a second cutout portion adjacent to at least one of edges of the second sub-pixel electrode and disposed along the at least one edge, and a third cutout portion isolating the first sub-pixel electrode from the second sub-pixel electrode.

19. The liquid crystal display of claim 18, wherein the first sub-pixel electrode and the second sub-pixel electrode are disposed at different heights.

* * * * *